US012807518B2

(12) United States Patent
Lahav et al.

(10) Patent No.: US 12,807,518 B2
(45) Date of Patent: Nov. 24, 2026

(54) WATER PURIFICATION SYSTEM AND USES THEREOF

(71) Applicant: TECHNION RESEARCH AND DEVELOPMENT FOUNDATION LIMITED, Haifa (IL)

(72) Inventors: Ori Lahav, Haifa (IL); Raz Ben-Asher, Haifa (IL); Paz Nativ, Haifa (IL); Noga Fridman-Bishop, Haifa (IL)

(73) Assignee: TECHNION RESEARCH AND DEVELOPMENT FOUNDATION LIMITED, Haifa (IL)

(*) Notice: Subject to any disclaimer, the term of this patent is extended or adjusted under 35 U.S.C. 154(b) by 369 days.

(21) Appl. No.: 18/571,848

(22) PCT Filed: Jun. 20, 2022

(86) PCT No.: PCT/IL2022/050659

§ 371 (c)(1),
(2) Date: Dec. 19, 2023

(87) PCT Pub. No.: WO2022/269604

PCT Pub. Date: Dec. 29, 2022

(65) Prior Publication Data

US 2024/0286930 A1 Aug. 29, 2024

Related U.S. Application Data

(60) Provisional application No. 63/202,738, filed on Jun. 22, 2021.

(51) Int. Cl.

| | |
|---|---|
| ***C02F 1/28*** | (2023.01) |
| ***A01K 63/04*** | (2006.01) |

(Continued)

(52) U.S. Cl.

CPC ............ *C02F 1/281* (2013.01); *A01K 63/045* (2013.01); *C02F 1/001* (2013.01); *C02F 1/66* (2013.01);

(Continued)

(58) Field of Classification Search

None

See application file for complete search history.

(56) References Cited

U.S. PATENT DOCUMENTS

2005/0139530 A1* 6/2005 Heiss ........................ C02F 9/00 210/257.2
2010/0264084 A1* 10/2010 Midorikawa ...... B01J 20/28028 210/85

(Continued)

FOREIGN PATENT DOCUMENTS

| | | |
|---|---|---|
| CN | 107486130 A | 12/2017 |
| JP | 2013228323 A | 11/2013 |
| JP | 2020185501 A | 11/2020 |

OTHER PUBLICATIONS

R. Ben-Asher, O. Lahav, H. Mayer, R. Nahir, L. Birnhack, Y. Gendel, Proof of concept of a new technology for prolonged high-density live shellfish transportation: Brown crab as a case study, Food Control. 114 (2020) 107239.

(Continued)

*Primary Examiner* — Richard C Gurtowski

(74) *Attorney, Agent, or Firm* — FisherBroyles, LLP; Roger L. Browdy; James E. Mrose

(57) ABSTRACT

The technology subject of the present application concerns a water treatment system utilizing hexacyanoferrate salts.

19 Claims, 6 Drawing Sheets

(51) Int. Cl.
*C02F 1/00* (2023.01)
*C02F 1/66* (2023.01)

(52) U.S. Cl.
CPC ...... *C02F 2209/06* (2013.01); *C02F 2209/14* (2013.01)

(56) References Cited

U.S. PATENT DOCUMENTS

| | | | | |
|---|---|---|---|---|
| 2014/0042068 | A1 | 2/2014 | Namiki | |
| 2018/0297864 | A1* | 10/2018 | Elsayed | B01J 20/3071 |
| 2025/0059070 | A1* | 2/2025 | Jin | C02F 1/46109 |

OTHER PUBLICATIONS

R. Ben-Asher, G. Stefansson, A. Ólafsdóttir, H. Mayer, R. Nahir, Y. Gendel, O. Lahav, On-board zero-discharge water treatment unit for well-boats: Arctic char as a case study, J. Appl. Aqua. (2021) 1-16.

A. Garrett, I. Lawler, M. Ballesteros, A. Marques, C. Dean, D. Schanbele, Outlook for European brown crab: Understanding brown crab production and consumption in the UK, Republic of Ireland, France, Spain and Portugal. (2015), ISBN No. 978-1-906634-87-2.

S.A. Marei, S.N. Basahel, A.B. Rahmatallah, Ammonium ion exchange equilibrium on potassium zinc hexacyanoferrate/II/ K2Zn3[Fe/CN/6]2, J. Radioanal. Nucl. Chem. Lett. 104 (1986) 217-222.

A. Takahashi, A. Kitajima, D. Parajuli, Y. Hakuta, H. Tanaka, S. ichi Ohkoshi, T. Kawamoto, Radioactive cesium removal from ash-washing solution with high pH and high K+-concentration using potassium zinc hexacyanoferrate, Chem. Eng. Res. Des. 109 (2016) 513-518.

Thierry Vincent et al, "Immobilization of Metal Hexacyanoferrate Ion-Exchangers for the Synthesis of Metal Ion Sorbents—A Mini-Review", Molecules, vol. 20, No. 11, Dec. 19, 2015 (Dec. 19, 2015), p. 20582-20613, XP055382362.

Yong Jiang et al, "High-capacity and selective ammonium removal from water using sodium cobalt hexacyanoferrate", RSC Advances, vol. 8, Oct. 8, 2018 (Oct. 8, 2018), p. 34573-34581, XP055702180.

* cited by examiner

WATER PURIFICATION SYSTEM AND USES THEREOF

TECHNOLOGICAL FIELD

The invention generally contemplates a novel water purification system, absorbing materials and method of using same.

BACKGROUND OF THE INVENTION

Live seafood products make for a fast-growing market in Europe and North America, while being a large and mature market in the Far East. Within live seafood, sea-catch shows the biggest price difference between live and frozen products. To date, live seafood commerce is mainly based on local products because of the considerable complexity associated with establishing a reliable and cost-effective supply chain. The seafood is transported alive from its origin (wild-catch or farms), through retailers' holding facilities to the market, where it is held alive until purchased by the end customer. To be successful, throughout the supply chain the seafood needs to be maintained in both good health and at a corresponding physical form, and the survival rate should be very high. The weakest link in the live seafood supply chain appears to be the live shipments, which are typically carried out at the lowest tolerated temperature by the specific species to ensure low metabolism-rate conditions, and particularly when the required transfer time is longer than a couple of days. Air freight is always an option but a very expensive one, hence when large quantities are considered, the focus should be on containers transported via rail-, truck-, or sea-freight.

In this regard the main economy-related challenge is the ability to apply sufficiently high shipment bio-loads (high animal densities) to render the operation profitable. Currently, to maintain adequate water quality during long-distance shipments, the bio-load is often reduced to inexpedient values, which instigates marketing limitations, since it invariably dictates high product prices. To enable feasible intercontinental live seafood commerce, new technologies are needed to overcome the limitation of the deterioration in the water quality in the holding tanks during the transport. Such techniques should address, as a minimum requirement, both the removal of ammonia and the minimization the microorganism population that develops in the water during the shipment.

Currently applied transportation technologies rely mostly on maintaining a low temperature and high dissolved oxygen concentration during the shipment, but they do not explicitly address the removal of toxic metabolites and microorganisms. As such, they are suitable for shipments that last up to 48 or perhaps 72 hours. Some advanced vivier lorries do contain $CO_2$ stripping capabilities and some even apply fine-particle flotation and filtration devices, but none of the currently applied technologies include ammonia removal or microbial control abilities. These are the limiting factors for increasing the shipping duration (and/or bio-loads) and thereby, for opening live seafood commerce to a much larger, global market.

Ben-Asher et al [1,2] recently reported on the only technology that has been thus far suggested for removing ammonia and microorganisms during prolonged live seafood transportations. This technology relies on the application of electrical current on the seawater, that inherently contains a high $Cl^-$ concentration, for producing $Cl_2$(aq), which both oxidizes ammonia directly into $N_2$(g) and disinfects the water. Ben-Asher et al. water treatment process is carried out in a batch manner, in a dedicated container, and the water is de-chlorinated before being returned, for ensuring that no chlorine residuals reach the live seafood holding tanks. However, due to the elaborate control that is required for applying this technology, it appears best fitted for operation within recirculating aquaculture systems, well boats, holding facilities and other applications in which close human intervention is possible, but less so for standalone containers.

BACKGROUND PUBLICATIONS

[1] R. Ben-Asher, O. Lahav, H. Mayer, R. Nahir, L. Birnhack, Y. Gendel, Proof of concept of a new technology for prolonged high-density live shellfish transportation: Brown crab as a case study, Food Control. 114 (2020) 107239.

[2] R. Ben-Asher. G. Stefansson, A. Ólafsdóttir, H. Mayer, R. Nahir, Y. Gendel, O. Lahav, On-board zero-discharge water treatment unit for well-boats: Arctic char as a case study, J. Appl. Aqua. (2021) 1-16.

[3] A. Garrett, I. Lawler, M. Ballesteros, A. Marques, C. Dean, D. Schanbele, Outlook for European brown crab: Understanding brown crab production and consumption in the UK, Republic of Ireland, France, Spain and Portugal. (2015), ISBN no. 978-1-906634-87-2.

[4] S.A. Marei, S.N. Basahel, A.B. Rahmatallah, Ammonium ion exchange equilibrium on potassium zinc hexacyanoferrate/II/K2Zn3[Fe/CN/6]2, J. Radioanal. Nucl. Chem. Lett. 104 (1986) 217-222.

[5] A. Takahashi, A. Kitajima, D. Parajuli, Y. Hakuta, H. Tanaka, S. ichi Ohkoshi, T. Kawamoto, Radioactive cesium removal from ash-washing solution with high pH and high K+-concentration using potassium zinc hexacyanoferrate, Chem. Eng. Res. Des. 109 (2016) 513-518.

GENERAL DESCRIPTION

The inventors of the technology disclosed herein have developed a new and a highly selective ammonium adsorption material, based on metal-hexacyanoferrate (M(II)HCF), that may be implemented in water purification systems and other related filtering systems. The active material may be used embedded in polymeric matrix materials, which may be used as encapsulating materials or as filtering means, e.g., membrane structures, or may be provided bound within carrier materials or matrix materials such as beads and particulate matter which can be used as filtering or absorbing materials in a variety of industrial applications.

Utility of the M-HCF neat or carried or contained in a carrier or a matrix material, as an adsorbing material, has been demonstrated by the inventors in salt-rich water systems, and more so in systems holding live aquatic animals, such as seawater fish and shellfish. In the unique approach disclosed herein, the adsorbing material was used for water purification in a variety of tank systems aimed at holding aquatic animals, such as transportation and holding facilities of live aquatic animals or aquaculture uses.

Unlike conventional ion-exchange systems which utilize resins (or zeolites), which have been found ineffective in removing $NH_4^+$ from salt-rich waters, containing also high $K^+$ and $Na^+$ concentrations, the adsorbing material of the invention demonstrated high affinity toward several monovalent cations ($Cs^+$, $Rb^+$, $NH_4^+$) present in such salt waters.

The overall approach presented herein allows for a continuous and efficient process for the removal of ammonia, organic matter and bacteria from water by applying the highly selective ammonium adsorption system in a water treatment system also contemplated herein.

Thus, in a first of its aspects, the invention concerns an adsorbent material or a porous matrix material comprising or encapsulating M-HCF, wherein M is a bivalent metal and HCF is hexacyanoferrate.

Also provided is an adsorbent material or a porous matrix material comprising or encapsulating M-HCF, wherein M is a bivalent metal and HCF is hexacyanoferrate, for use in water purification.

In some embodiments, the material is for use in a water treatment system in a water tank configured to hold water and live aquatic animals (such as fish, shellfish and other living sea animals).

In some embodiments, the material M-HCF, as defined, may be implemented in a 3D matrix material shaped into a sheet or an object and having a structure permitting permeation or transfer of water therethrough. In some configurations, the matrix material may be configured as a filtering member or a membrane or a unit. The material from which a matrix material may be made of may vary. It may be composed of a polymeric- or a glass-based material which may be structured to provide selective partition by including pores of specific sizes that enable contact between the water and ions contained in the water and the M-HCF embedded in the matrix material. The matrix material may be configured for microfiltration, ultrafiltration, nanofiltration and reverse osmosis.

In another of its aspects, the invention provides use of an adsorbent material, e.g., in a form of an adsorbing medium or a porous matrix, the adsorbing material comprising or encapsulation M-HCF, wherein M is a bivalent metal and HCF is hexacyanoferrate, wherein the use is in construction or operation of a water treatment system for water tanks configured for containing water and live aquatic animals.

Also provided is a porous matrix material comprising or encapsulating M-HCF. wherein M is a bivalent metal and HCF is hexacyanoferrate, the porous matrix material being for use as an adsorbent material in a system for treatment of water tanks configured for holding water and live aquatic animals.

The adsorbing capabilities of M-HCF or a medium or a material containing same are evident from the ability of the material to physically or chemically associate to and dissociated from the materials to be removed from the waters. Without wishing to be bound by theory, the adsorption mechanism of HCF is known to be a mixture of ion-exchange, ion trapping, and complexation interactions. The voids in the cubic lattice of HCF that are surrounded by cyano-bridged metals create spherical gaps that allow hydrated ammonium and other large monovalent metal ions to be exchanged with sodium ions, which are located at the center of the 3D lattice. Since the hydrated sodium ion is larger than the hydrated ammonium, it cannot be easily exchanged back with $NH_4^+$(for that to happen, the Na+ concentration should be much higher than in seawater). The size and dimensions of the lattice gaps, together with the internal cubic structure of the metal-hexacyanoferrate crystal, are believed to be the reason for the high selectivity towards $NH_4^+$. $Rb^+$ and $Cs^+$. That said, since the $Rb^+$ and $Cs^+$ concentrations in seawater are very low, these ions do not interfere with the ability to adsorb the ammonium.

Adsorption capabilities of an adsorbent material of the invention may also be renewed by treating the carrier or matrix material containing the M-HCF. e.g., beads, with a high concentration (>2 M) of a salt solution containing sodium ions, e.g., NaCl solution. Such a high concentration restores the $NH_4^+$ adsorption capacity thereby allowing for a multiple-cycle use of the adsorbent material.

As noted, the adsorbent or porous matrix material which comprises or encapsulates or holds the M-HCF, as defined, is any solid material which can hold an amount of the M-HCF such that materials contained in waters in which M-HCF is present (or come in contact with, or flow through) can come in contact with the M-HCF and thus be adsorbed or generally entrapped by the M-HCF. Typically, the material is a porous material that contains the M-HCF. The porous material may be a flowing material such as a powder or a solid continuous bulk material such as a molded porous structure, e.g., a polymeric membrane.

In some embodiments, the medium is provided as a porous filtering medium through which salt waters can flow or pass, and which can selectively adsorb monovalent cations such as $NH_4^+$, $Rb^+$ and $Cs^+$. Thus, the medium may be a matrix material provided as a solid material or as an encapsulating material having a plurality of pass-through pores through which a liquid medium may pass. The matrix material may be formed into any shape and form, including for example, beads, a powder comprising nano- or micro particles, flat or 3D-shaped filters and others.

The M-HCF is integrated into a medium/material or encapsulated in a matrix material that may typically be selected to have high physical and chemical stabilities, along with relatively high porosity, and a minimal influence on the ion exchange kinetics. The solid material or matrix may be formed of any porous water-insoluble material. In some embodiments, the solid material or matrix may be composed of a material selected from a polymeric material, a porous glass, a ceramic material and others.

In some embodiments, M-HCF is integrated into a 3D porous solid material, as disclosed herein.

In some embodiments, the matrix material is formed into beads, which contain the M-HCF, and is optionally a polymeric material.

The polymeric material constructing any element, member, or unit according to the invention may be any of those known in the art including polyethylene, polypropylene, polyvinyl alcohol, ethylene vinyl alcohol, polyamide, polystyrene, polylactic acid, poly ethers, polyhydroxyalkanote, polycaprolactone, polyhydroxybutyrate, polyvinyl acetate, polyacrylonitrile, polybutylene succinate, polyvinylidene chloride, starch, cellulose, polyhydroxyvalerate, polyhydroxyhexanoate, polyanhydrides, polyethylene terephthalate, polyvinyl chloride, polysulfone and polycarbonate. In some embodiments, the polymeric material is selected as aforementioned and designed to have the aforesaid characteristics.

In some embodiments, the matrix material is formed into beads and is made of a polysulfone. Non-limiting examples of polysulfones include polyarylene sulfone (PAS), polyether sulfone (PES), polysulfone (PSU) and others.

In some embodiments, the polyethersulfone is PES and the adsorbing material of the invention may be in a form of PES-based porous beads encapsulating or holding or comprising or consisting of M-HCF, as defined herein.

As used herein, M-HCF is a material comprising a bivalent metal ion, designated M, and an anionic species being hexacyanoferrate. The iron atom in the HCF is $Fe^{+2}$ ion, yielding an $HCF^4$ anion. Reference to "M-HCF" encompasses various forms of a metal hexacyanoferrate. Such forms may be mixed metal forms, comprising two or more different metal cations or two or more differently charged metal cations. Examples of M-HCF materials used as disclosed herein include M-HCF, wherein M is a bivalent metal cation; $M_2(HCF)_2$, wherein M is a bivalent metal cation; $M_3(HCF)_2$, wherein M is a divalent cation; $M_1M_2(HCF)n$, wherein $M_1$ is a monovalent metal cation (such as Na, K, etc.) or a plurality of monovalent metal cations and $M_2$ is a divalent metal cation, as disclosed herein, or a plurality thereof, and wherein n is a number of HCF units being between 1 and 3; $M_{12}M_{23}[Fe^{II}(CN)_6]_2$, wherein $M_1$ is a monovalent metal cation (such as Na, K, etc.) and $M_2$ is a divalent metal cation; and others.

In some embodiments, M-HCF includes in addition to metal M one or more monovalent metal cations. In some embodiments, M-HCF is of the structure $M_1M_2(HCF)n$, wherein $M_1$ is a monovalent metal cation (such as Nat, $K^+$, $Cs^+$, $Rb^+$ and $NH_4^+$) or a plurality of monovalent metal cations and $M_2$ is a divalent metal cation, as disclosed herein, or a plurality thereof and wherein n is a number of HCF units being between 1 and 3. In some embodiments, M-HCF is of the structure $M_{12}M_{23}[FeII(CN)_{6]2}$, wherein $M_1$ is a monovalent metal cation (such as Nat, $K^+$, $Cs^+$, $Rb^+$ and $NH_4+$) and $M_2$ is a divalent metal cation.

In some embodiments, M-HCF is of the structure $M_{12}M_{23}$ $[FeII(CN)_6]_2$, wherein $M_1$ is K and $M_2$ is Be, Mg, Ca, Sr, Ba, Ni, Cu, Zn, Fe, Mn, or Cd.

In some embodiments, M-HCF is of the structure $K2M_{23}$ $[FeI(CN)_6]_2$, wherein $M_2$ is Zn, Co, Ni or Cu.

In some embodiments, M-HCF is selected from $K_2Zn_3[Fe^{II}(CN)_6]_2$, $K_2Co_3[Fe^{II}(CN)_6]_2$, $K_2Ni_3[Fe^{II}(CN)_6]_2$, $K_2Cu_3[Fe^{II}(CN)_6]_2$, and others.

In some embodiments, M-HCF represents a mixture of salt or complex species, each containing a divalent metal cation and HCF, wherein optionally further monovalent metal cations may be present and wherein optionally the number of HCF units is 1 or greater than 1.

M-HCF may be manufactured according to acceptable protocols or may be obtained from commercial sources. Processes for making M-HCF are provided in a variety of literature sources, including Yang et al., Nano Energy 99 (2022) 107424.

The bivalent metal cation may be any metal cation of Group 2 of the Periodic Table and any bivalent metal cation selected amongst the transition metals. Non-limiting examples include Be, Mg, Ca, Sr, Ba, Ni, Cu, Zn, Fe, Mn, Cd and others.

In some embodiments, the metal cation is selected from Zn, Co, Ni, Fe and Cu.

In some embodiments, the material is Zn-HCF.

In some embodiments, the material is PES-Zn-HCF, wherein PES is a matrix or carrier material, e.g., in a form of beads, and Zn—HCF is as defined.

In some embodiments, the material is $M^1{}_2Zn_3(Fe(II)$ $(CN)_6)_2$, wherein $M_1$ is a monovalent metal cation such as Na or K. In some embodiments, the material is $K_2Zn_3(Fe$ $(II)(CN)_6)_2$.

The live "aquatic animals" to be held in a tank or container forming part of a system of the invention are any salt water (seawater) or fresh water or otherwise water-living creatures which may be vertebrate or invertebrate. The term includes fish of various types, crustations of various types, including decapods, seed shrimp, branchiopods, krill, remipedes, isopods, barnacles, copepods, amphipods and mantis shrimp and crabs, turtles, octopuses, lobsters, seahorses and others.

The invention further provides a reactor or a column comprising an adsorbing material according to the invention. The reactor is a flow-through unit enabling water flow therethrough. The reactor may be implemented in conventional water treatment systems used for removing ammonium and/or other cations from water tanks and other water reservoirs containing aquatic animals. Apart from the reactor or column, the water treatment system, or water purification system may be equipped with one or more other purification units. In such a system, waters from a water reservoir are flown into and through one or more purification or filtering units, one of which being a reactor, a column or a vessel comprising the adsorbing material of the invention. Treated waters having passed the one or more purification or filtering units may thereafter be reused or returned into the water reservoir. The process may be continuous.

The invention further provides a purification unit implementing a material or a matrix comprising M-HCF according to the invention. The purification unit may be implemented in a purification system according to the invention.

Thus, the invention further provides a water treatment or water purification system implementing an absorbent material according to the invention, as disclosed herein, or a purification unit (or a module), which may be an add-on to existing water treatment systems.

In some embodiments, the purification unit or system may comprise a filtering unit for filtering particulate materials of sub-micron sizes; e.g., a size below 0.5 microns. The filtering unit may comprise a filtering medium such as an activated carbon, screen filter, disc filter, membrane filter, media filter and others.

In some embodiments, the purification unit or system may comprise a filtering unit in a form of membrane filtration unit. The unit may be a micro or ultra-filtration unit.

In some embodiments, the purification unit or system may comprise at least one membrane filtration unit and at least one unit comprising a filtering medium.

In some embodiments, the purification unit or system may comprise a screen filter such as a 20 μm disc/screen filter.

The purification unit or system of the invention may be utilized for treatment of salt-rich waters, such as seawater. The salt-rich water is any water comprising a total concentration of monovalent cations that is above 4,000 mg/L.

The term "treatment" in the context of the technology disclosed herein means removal, by use of an adsorbing material of the invention, of monovalent cations such as ammonium, $Rb^+$ and $Cs^+$. In some embodiments, the term encompasses removal of ammonium cations. As systems of the invention are further provided with one or more additional filtering units, membranes or units, the term may also encompass removal of organic materials and particulate materials.

The purification unit or system may be implemented in closed pisciculture or aquaculture environments (an environment containing aquatic animals), which may be established as ground facilities or as moving facilities, such as vivier lorries, trains, trucks and ships. In such cases, the water reservoir is a tank configured for or containing live aquatic animals such as fish, shellfish and other water living species. These species may be forms of sea life regarded as foods by humans, aquariums, ornamental surroundings or others.

A system of the invention typically comprises a tank configured for holding live aquatic animals, a purification unit in a form of a membrane, a filtering unit or a tank comprising an adsorption material according to the invention, optionally one or more other purification or filtering units and means to circulate waters from and to said tank for holding the live aquatic animals. The means to circulate the waters comprises pipes and one or more pumps.

In some cases, the container or tank configured for holding water and live aquatic animals may be of any shape and size and may comprise an amount of the adsorbing material of the invention in a form that maintains a low concentration of ions such as $NH_4^+$, $Rb^+$ and $Cs^+$ in the water. In such configurations, water contained in the container or tank comprising the aquatic animals need not be circulated to achieve removal of such monovalent cations.

In some embodiments, the container or tank that is configured for holding the live aquatic animals may be a partitioned tank, containing two or more containers, each being individually addressed and separately purified or two or more containers sharing a single water purification means.

In some embodiments, the container or tank is mounted on a vehicle such as ground vehicle or a maritime or an airplane, including boats, ships, trucks, delivery vehicles, planes, trains, etc.

In some embodiments, the container or tank is a holding water reservoir for growing sea water aquatic animals, freshwater ornamental fish and other aquatic animals or fresh water holding reservoir.

In some embodiments, the container or tank is a ground or an artificial freshwater reservoir, implemented with the adsorbing material of the invention.

Also provided is a water tank configured to hold salt water and live aquatic animals, said water tank being provided with (i) an amount of the adsorbing material or (ii) an auxiliary unit that is configured to be in liquid communication with said water tank and which comprises adsorbing materials according to the invention.

In another aspect, there is provided a water treatment system, the system comprising a tank configured for holding water and live aquatic animals, a circulation module configured and operable for circulating water present in said tank through a purification unit implemented with a solid medium comprising M-HCF.

As used herein, the term "circulate" or "circulation" means a flow of waters from a tank through a purification unit and back into the tank. Waters exiting the tank may or may not contain monovalent ions to be removed, and waters exiting the purification unit may contain low concentrations of monovalent ions or may be free thereof.

In some embodiments, the water treatment system is configured as a ground facility. In some embodiment, the system is configured as a moving facility for use in transporting live aquatic animals.

In some embodiments, the circulating module comprises the purification unit.

In some embodiments, the circulating module is in a form of an external loop comprising means for flowing water from said tank and through the purification unit and back into the tank, wherein the purification unit is positioned at a point along the external loop extending a tank water outlet and a tank water return inlet.

In some embodiments, the external loop further comprises at least one additional purification and/or filtering units.

The invention further provides a circulating water purification system, the system comprising

- a tank or a container configured for holding water and live aquatic animals,
- a purification unit,
- optionally at least one sensor and a controller, and
- optionally a water reservoir, the purification unit including a membrane or a filtering unit or a filtering medium or an adsorbent according to the invention,
- wherein the tank or container is in liquid communication with the purification unit to permit flow of water contained in said tank or container into and through the purification unit and to receive treated water existing the purification unit;
- wherein the at least one sensor, if present, is provided in said tank or container and is electrically connected with the controller; the sensor being configured and operable to detect and report to said controller a rise in a concentration of at least one ion (e.g., ammonium ions, H+ and others) in the water, whereby the controller is configured to initiate circulation of the water through the purification unit.

In some embodiments, the system comprises at least one sensor and a controller.

In some embodiments, any of the systems of the invention may comprise a sensor that is configured and operable to detect and report a rise in a concentration of at least one ion, e.g., ammonium ions, in the water. In some embodiments, the sensor is a pH sensor.

In some embodiments, any of the systems of the invention may comprise a pH controller configured and operable to maintain, e.g., via strong acid addition, a water neutrality, to thereby shift ammonia that may be present in the system towards $NH_4^+$, thereby not allowing the nonionic ammonia ($NH_3$) concentration to rise.

Further provided is a water purification system comprising a purification unit having an inlet and a permeate outlet; a circulation conduit configured and operable to communicate water from a water tank through a tank outlet into the purification unit and to communicate the permeate into the water tank through a tank inlet, wherein the inlet and outlet form a re/circulation loop; the purification unit including a filtering medium or an absorbent according to the invention.

In some embodiments, a pump is positioned along the re/circulation loop.

In some embodiments, systems of the invention may comprise one or more auxiliary vessels or containers that are configured and provided with means to receive or contain or discharge a volume of pretreated water or post treated water.

In some embodiments, the system comprises one or more additional purification units. In some embodiments, the additional one or more purification units comprises a carbon-based filter or a biological filter.

The invention further provides a water purification system comprising:

- a water tank configured for holding water and live aquatic animals;
- a first auxiliary container for receiving a volume of water to be treated from said water tank;
- a purification unit containing M-HCF or a medium comprising same, said unit being provided downstream of the first auxiliary container and in fluid communication with the first auxiliary container for receiving the volume or water from the water tank;
- a second auxiliary container provided downstream of the purification unit and in fluid communication with the purification unit and comprising an outlet port arranged to communicate filtered water back into the water tank;
- optionally one or more purification units for comprising one or more of a carbon-based filter, and a biological filter.

In some embodiments, a purification unit in any system of the invention is provided as a purification cartridge, which is optional discardable or reusable.

The invention further provides a purification cartridge comprising an absorbent of the invention, the cartridge being configured for assembly into a water purification unit in a water purification system of the invention.

Also provided are methods for purifying water or salt-rich waters and methods for removing monovalent cations selected from $NH_4^+$, $Rb^+$ and $Cs^+$ or for reducing concentration of said cations from water reservoirs. Methods of the invention generally comprise flowing salt-rich waters or water present in a water reservoir through a medium comprising an adsorbing material of the invention. In some embodiments, methods of the invention allow for the removal of ammonium.

In some embodiments, the water reservoir contains salt-rich water or seawater.

In some embodiments, the water reservoir or salt-rich water contain live aquatic animals.

In some embodiments, waters are additionally flowen through an activated carbon filter for reducing the total organic carbon, and/or optionally through a filtering unit for removing particular materials of above or sub-micron sizes.

In some embodiments, desorption capabilities of the adsorbing material may be regenerated by desorption of the adsorbed ion, e.g., $NH_4^+$ by washing the adsorbing material with a highly concentrated (>2 M) NaCl solution, which restores the $NH_4^+$ adsorption capacity thereby allowing for multiple-cycle use. The ammonium from the regeneration solution may be removed from the regeneration solution by any method known in the art. Such methods may comprise electrooxidation, direct oxidation, stripping, addition of oxidizing chemicals or any other means for allowing the reuse of the regeneration solution, and completely removing the ammonia from the aqueous form.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

In FIG. 5A, the solid black line indicates the theoretical TAN concentration that would accumulate in the absence of treatment. The dashed line (FIGS. 5A-B) indicates [TAN]=10 mgN/L, which was suggested as a sub-acute concentration for European brown crab. Temperature=3.5° C.; duration-21 days.

(FIG. 8B) Normalized calculated $NH_3$ excretion rates by the crabs in the Test and Control tanks.

DETAILED DESCRIPTION OF EMBODIMENTS

Wet live seafood transportations are limited in time and bio-density by the ammonia concentration that is emitted by the animals and accumulates in the holding seawater. Since wet transports are less stressful to the animals and much more economic than air-freight-based dry transports, a solution to the ammonia accumulation is imperative. Zn-hexa-cyano-ferrate (ZnHCF) is a material characterized by a very high ion-exchange affinity towards $NH_4^+$ ions, and a correspondingly high operational adsorption capacity, even at the high seawater $Na^+$ concentration. A field test is presented here that tested the conditions that develop in transport containers filled with 150 kg/m3 of European Brown Crabs (Cancer pagurus) during a five-day transport, in the presence of 7.54 kg of self-synthesized poly-ether-sulfone coated ZnHCF beads, vs. a control test, that was operated similarly, but without the beads. The results show clearly that the presence of the adsorbing beads significantly curbed the TAN concentration in the test tank and preserved the crabs at much better viability and much lower mortality 24 and 48 hours after the transport's termination. The control test was stopped after merely 2.3 days due to high TAN accumulation. The ammonia excretion rate of Brown Crabs under holding conditions (4-8° C.) as a function of the water temperature was quantified at 4.6±2.1 mgN/(kg·d·° C.).

Figure 1:
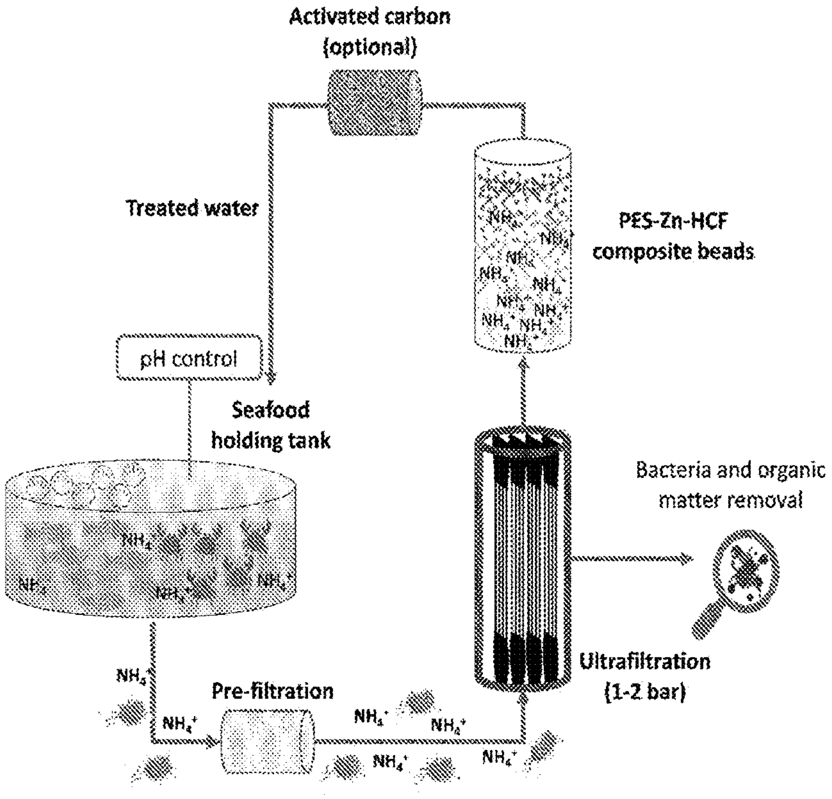
FIG. 1 is a schematic of a water treatment system according to some embodiments of the invention.

An exemplary system and process according to some embodiments of the invention are depicted schematically in FIG. 1. As depicted, a system according to the invention includes a reactor containing PES-Zn-HCF composite beads, as an exemplary absorbent, that is located downstream to an ultrafiltration (UF) membrane containing module. The UF membrane is applied to remove microorganisms from the recirculating stream with the aim of both protecting the beads from microbial biofouling and reducing the organic matter and the microbial loads in the seafood holding tanks. Although seafood transportation is performed at low temperatures (normally 3-5° C.), the development of microbial biofilms on the coated HCF is inevitable after a short while and is thereby minimized. High organic matter concentrations and the resulting high microbial load in the seafood tanks lead to quick deterioration of the water quality in the holding tanks, leading further to a decline in the seafood health condition and eventually to low survival rates.

The UF membrane module is operated to maintain a low microbial load and low organic matter concentration in the holding tanks by separating them continuously from the recirculating water. Since transportation systems are required to operate at zero water discharge, the UF filter is designed in excess such that it will not clog and thus will not require back-washing during the shipment period. Holding facilities, which holds live seafood for long periods may replace water, so the UF component should be designed accordingly, for example, such a flush can be made from external water source.

An activated carbon filter is located downstream from the metal-HCF column, for reducing the total organic carbon, and by that, contributing to the maintenance of low microbial load in the holding tanks' water. By the end of each shipment the exhausted beads undergo $NH_4^+$ desorption with a highly concentrated (>2 M) NaCl solution, which restores the $NH_4^+$ adsorption capacity thereby allowing for multiple-cycle use.

To improve the adsorption efficiency of $NH_4^+$ on the Zn-HCF, the process design allows the TAN concentration in the seafood tanks to increase during the transport to up to its toxicity threshold (commonly >10 mgN/L). However, since $NH_3$ is the more toxic of the two ammonia species, a pH controller is applied such that the pH is maintained (via strong acid addition) at around neutrality to shift the ammonia system towards $NH_4$+, thereby not allowing the nonionic ammonia ($NH_3$) concentration to exceed its toxicity threshold (commonly >0.05 mgN/L). It is emphasized that an optimal pH and TAN concentration values should be defined separately for each seafood species and that the system would be designed in a flexible manner to accommodate a large range of operational set-points.

Experimental Setup I

Materials and Methods

Fabrication of the PES-Zn-HCF Composite Beads

The Zn-HCF powder was prepared following a procedure from [3]. Two solutions of $ZnCl_2$ and $K_4[Fe(CN)_6]\cdot 3H_2O$ of 0.5 molar were mixed at a respective 3:2 ratio. The slurry was then centrifuged and rinsed five times with deionized water (DIW), then dried at 60° C. for 24 h, which was followed by grinding and sieving (Mesh #35). The resulting powder is denoted Zn-HCF in the following text.

PES (BASF Ultrason E grade 6020P) flakes were mixed with an N-Methyl-2-pyrrolidone (NMP) solvent at a ratio of 1:5.66 and left overnight to fully dissolve. The solution was then mixed with the Zn-HCF powder at three weight ratios (66, 33 and 20% of PES (w/w)). The production of the composite material was done by controlled precipitation of the PES using a room temperature aqueous bath and a vertical standing syringe pump (GenieTouch™ Syringe Pump, Kent Scientific) equipped with two 50 ml plastic syringes (HSW® NORM-JECT®) without a needle (flow rate=0.2 mL/min; drop height=4 cm). The produced composite beads were left overnight in DIW, and then followed by heating them to 60° C. in fresh DIW for 10 hours to remove the remaining solvent.

PES-Zn-HCF Composite Beads and Powder Characterization

All the characterization tests (adsorption capacity, kinetics and regeneration stability) were performed using a shaking water bath (Julabo® SW23, RPM=180) at a controlled temperature.

Adsorption Capacity Isotherms and Kinetic Experiments

The adsorption isotherms were determined using three replicates of 125 mg Zn-HCF in the form of PES-Zn-HCF composite beads (20% PES(w/w)) that were placed for 48 h in a 50 ml solution at a range of initial [$NH_4$+] concentrations at both 25° C. and 3.5° C., in SW background. The kinetic tests were performed with three PES-Zn-HCF composite beads (66, 33 and 20% PES to Zn-HCF powder ratios (w/w)). Three replicates of 0.125 mg of Zn-HCF were placed for 48 h in a 3.5° C., 51 ml solution with an initial [$NH_4$+] of ~50 mgN/L, SW background. Samples were taken at given predetermined intervals. The adsorption capacity (q, mgN/g Zn-HCF) was then calculated using Equation (1).

$$q = (C_0 - C_i) \times \frac{V}{m} \tag{1}$$

Wherein: C-initial and time dependent (0 and i notations, respectively) $NH_4$+ concentration (mgN/L); V-solution volume (L); and m-mass of Zn-HCF (g).

Isotherm Adsorption Models

The empirical isotherms were fitted by the Langmuir and Freundlich sorption models. $R^2$ parameter was used to compare the model results, with a target value nearest to unity.

Regeneration Stability Tests

Two sets of adsorption-regeneration experiments were performed for assessing the reuse potential of the PES-Zn-HCF composite beads:

Batch Tests

Ten cycles were performed, each consisting of three replicates of 0.25 g Zn-HCF powder coated with PES dispersed in a 50 ml of seawater with an initial $NH_4^+$ concentration of 100 mgN/L. After 24 h, the TAN concentration was measured and the Zn-HCF beads were inserted into a 50 ml of 3 M NaCl solution. The extracted $NH_4$+ was measured again after 24 h and the beads were subjected to another adsorption cycle. The beads were washed with DIW after each step. The capacity of the PES-Zn-HCF composite beads was calculated using Equation (1) after each adsorption step. The water temperature was kept at 25° C. using a water bath.

Flowthrough Tests

A PVC column filled with 28 g of Zn-HCF in the form of composite PES-coated beads (weight ratio=20%) was used. Five cycles were performed, each consisting of three steps: (1) adsorption-SW with a TAN concentration of 16 mgN/L (10.6 L); (2) chemical regeneration-6 M NaCl solution (12.5 L); and (3) electrochemical ammonia oxidation from the regeneration solution—the solution was circulated through an electrolyzer (KLOROGEN®-$M_{40}$ electrolyzer, V~2.4 V) and the discharged ammonia from step 2 was oxidized to $N_2$(g) by means of indirect ammonia oxidation to a TAN concentration tending towards zero. At the end of the electrochemical step, the residual chlorine was reduced by a strong reducing agent (thiosulphate) and the solution was maintained for 48 hours to ensure complete removal of residual chlorine prior to being re-contacted with the PES-Zn-HCF composite beads.

Regeneration efficiency was calculated by a mass balance between the adsorption and regeneration steps using Equation 2:

$$\text{Efficiency}(\%) = \frac{V_{Ads\_solution} \cdot (C_i - C_f)}{V_{Reg\_solution} \cdot (C_f - C_i)} \times 100 \quad (2)$$

Where: V—is the adsorption and regeneration solutions volume (L, Ads and Reg notations, respectively).

21-Day Non-Live Simulations

Two 21-d transport simulations were conducted with seawater at 4° C., with two $NH_4^+$ daily mass doses intended to simulative two brown crab bio-loads: 150 and 320 kg/m3 (denoted Simulations #1 and #2, respectively). Simulations #1 and #2 were conducted using two sealed containers holding 3.00 and 1.29 L of seawater, respectively. Inorganic carbon (CT) was partially removed from the seawater by HCl addition and aeration prior to the experiments, for minimizing pH variations during the experiments. pH was set at 6.90. $NH_4Cl$ was added daily (4.50 and 4.25 mgN in Simulations #1 and #2, respectively) to mimic the average ammonia that is known to be excreted at the selected brown crab bio-loads. The PES-Zn-HCF composite beads were held in 0.3 L PVC columns and the solution was recirculating (15 mL/min) through them and back to the holding containers.

Simulation #1: a two-column setup was tested: (1) a column with 28 g Zn-HCF in the form of PES-Zn-HCF composite beads (50% weight ratio) and, (2) a column with beads containing only PES, with a similar mass.

Simulation #2: a three-column setup was tested: (1) a column with 28 g Zn-HCF in the form of PES-Zn-HCF composite beads (50% weight ratio) and, (2) a column with 28 gZn-HCF in the form of PES-Zn-HCF composite beads (20% weight ratio); and, (3) a column with beads containing only PES, with a similar mass.

Simulation #2 also consisted of a Control, i.e., a sealed bottled that underwent the same treatment as the other containers, but without recycling the water through an $NH_4^+$ adsorption column.

21-Day Experiment with Live Seabream Fish

Experimental Setup

Two 100 L tanks were filled with 50 L of seawater. Both tanks consisted of aeration and a pH control system: Thermo alpha 190 controllers connected to a Prominent Gamma metering pump for acid dosage ($[H_2SO_4]$=0.25 N). Tank 1 (termed "Test" in this section) was recirculated (HRT 0.2 L/h) using a Cole Parmer peristaltic pump through a column filled with 105 g Zn-HCF in the form of PES-Zn-HCF composite beads. A 55 μm disc filter was located upstream to the Zn-HCF column. The control tank was filtered once a week to remove suspended material using a 55 μm disc filter.

Fish Handling

Twenty (20 g) Gilthead seabream (*Sparus aurata*) were placed in each of the tanks (Tank 1 and Tank 2) following 48 h of acclimation of the fish to the test conditions (salinity and temperature). The fish were fed twice a day using Raanan Fish Feed (45% protein) according to 0.8% of their body weight (3 g/d) to simulate an ammonia excretion rate that is equivalent to 270 kg/m3 of European brown crab or 150 kg/m3 of Arctic Char under holding/transportation conditions (starvation at 4° C.) [5, 6].

Water Analyses

TAN was determined using the salicylate method. Cations were determined using PlasmaQuant PQ 9000 Elite, High-Resolution Array ICP-OES (Analytik Jena AG, Germany). The chloride concentration was determined using Metrohm 930 compact IC flex ion chromatograph operated with Metrosep A supp7 250/4 column for the determination of anions. Alkalinity was measured using the Gran titration technique. pH and temperature were measured twice a day using a Metrohm 914, and dissolved oxygen was measured using a Handy Oxyguard meter. All samples were filtered (0.45 μm) and maintained at 4° C. $CO_2$ concentrations were calculated using the PHREEQC software using the measured alkalinity and pH values. Nitrite and nitrate were analyzed using the Standard Methods colorimetric method.

Results and Discussion

Adsorption Material Characterization

Adsorption Isotherms and Kinetics

Figure 2:
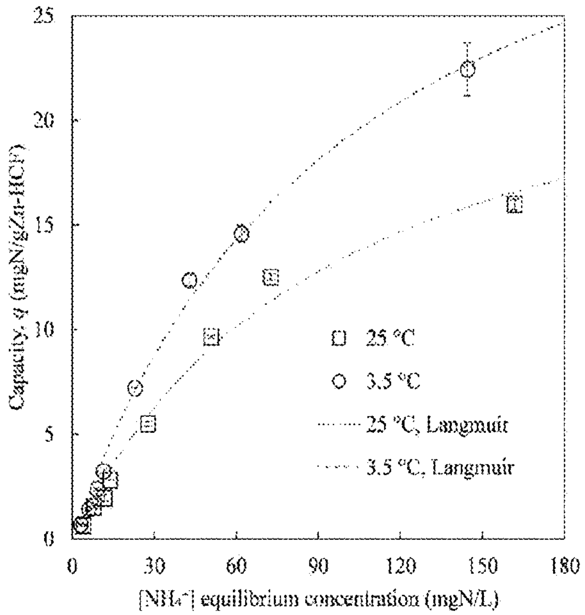
FIG. 2 shows ammonium adsorption isotherms at 25° C. (squares □) and 3.5° C. (circles ○) obtained with PES-Zn-HCF composite beads (PES weight=20%). The Langmuir model fitting curve (dashed lines) is shown for both temperatures. Retention time=48 hours (n=3).

FIG. 2 shows the isotherms obtained from 48-h $NH_4$+ seawater adsorption experiments conducted with the Zn-HCF composites (PES weight=20%) at 3.5° C. and 25° C. Shown also on FIG. 2 are Langmuir fitted model lines. The calculated R2 for the Langmuir model fitness was higher than the Freundlich isotherm model, with values >0.985.

From the Langmuir model a maximal capacity of 38.7 and 26.5 mgN/gZn-HCF was predicted at 3.5° C. and 25° C., respectively. The higher adsorption capacity of the Zn-HCF at the lower temperature is likely attributed to the exothermic nature ($\Delta H<0$) of the cations' adsorption onto the Zn-HCF crystal's lattice.

The maximal capacity predicted by the Langmuir model lies within the range of values reported in [4] (2.28 meq/g Zn-HCF or 31.92 mgN/g Zn-HCF) and also of the theoretical value predicted for the fabricated Zn-HCF crystal (K1.98 Zn2.94(II) $[Fe(II)(CN)_6]_2 \cdot 6.2H_2O$), using the crystal molar mass as the base for the capacity calculations, as suggested by [5] (MW=804.8 g/mol, maximal capacity of exchangeable cations of 2.46 meq/gZn-HCF or 34.4 mgN/g Zn-HCF).

Figure 3:
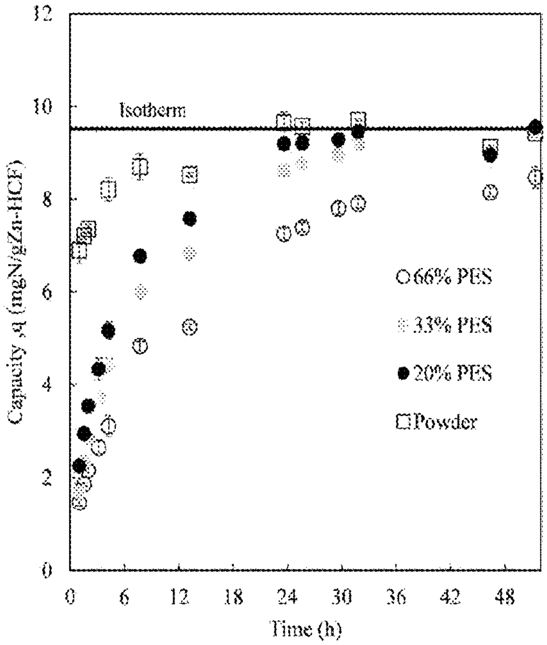
FIG. 3 shows the results from kinetic experiments, showing the capacity (mgN/gZn-HCF) over time of three tested PES-Zn-HCF composite beads characterized by 66%, 33% and 20% PES weight ratio (○, •, and •, respectively) and dispersed Zn-HCF powder (u). Temperature=3.5° C.; n=3; [NH4+]0~50 mgN/L; t=51 h; and Zn-HCF=0.125 g.

The results of the kinetic experiments are presented in FIG. 3. The 33% and 20% composites were able to reach the capacity of the non-covered Zn-HCF powder after 51 hours (>99%), while the 66% composite reached 89% of the non-PES-covered Zn-HCF powder after 51 hours and would have likely also reached the same capacity had the experiment been continued for another day or so. In the graph, the black horizontal line represents the capacity of the non-PES-covered powder, using the final equilibrium concentration from the kinetic experiments and plugging it into the Langmuir model equation.

From the results of the current characterization section the followings can be concluded: (1) The produced Zn-HCF crystal has adsorption properties similar to equivalent materials reported in the literature; (2) The encapsulation of the Zn-HCF crystal in the PES polymer slows down the kinetics of the adsorption for all the tested weight ratios, but the adsorption capacity is not significantly affected even at the high PES to Zn-HCF mass ratios that were tested; (3) Lower temperatures favor $NH_4$+ adsorption; and (4) the adsorption kinetics, despite being slow relative to common ion exchange operations, are adequate for the developed process which is operated in a batch manner for a long time period of time (up to 21 days).

Adsorption/Regeneration Stability of the Composite PES-Zn-HCF Beads

Figure 4:
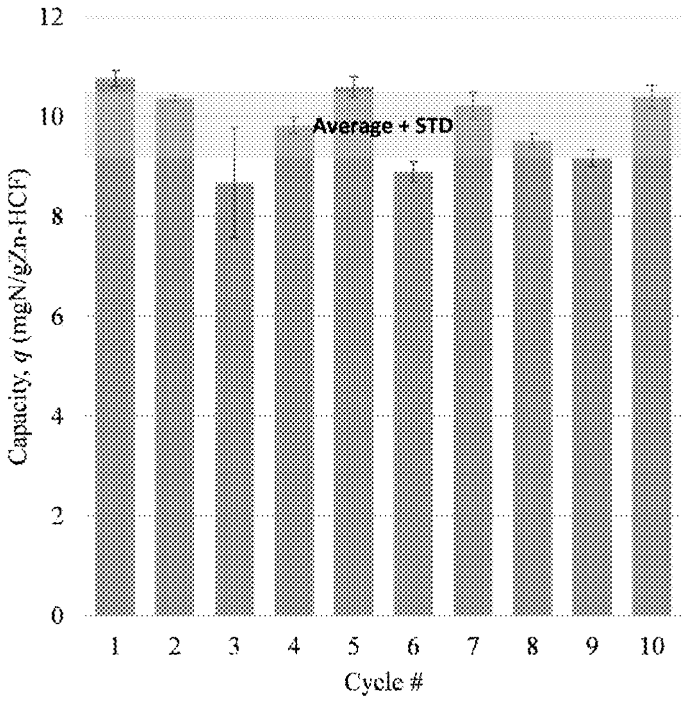
FIG. 4 demonstrates batch regeneration performance of the PES-Zn-HCF composite material and stability experiments showing the capacity of the composite beads in ten consecutive cycles of adsorption followed by chemical regeneration. Temperature=25° C., RPM=180, n=5.

FIG. 4 shows the results obtained from 10-consecutive adsorption-regeneration batch cycles. The results indicate that after 10 cycles of chemical regeneration the capacity of the composite beads remained within the range of 9.8+0.7 mg/g, practically meaning that the capacity of the material remained constant. A slightly higher capacity was recorded in the first adsorption cycle, when the composite material was new, which is a common observation with pristine ion exchange materials.

The results of the flowthrough tests (Table 1) showed high regeneration efficiency with a relative low average error in the mass balance calculations of the adsorption/regeneration tests, indicating complete regeneration of the composite beads over the 5 tested cycles. The ammonia electrochemical oxidation step was able to reduce the $NH_4$+ concentration in the regeneration solution to below 0.2 mgN/L in each of the cycles, a clear indication that at the end of this step, the regeneration solution was ready to be used efficiently in the next desorption cycle.

These experiments led to the following conclusions: (1) The PES-Zn-HCF composite beads showed good stability and high regeneration ability at both high and low ammonia concentrations and with 3 and 6 M NaCl regeneration solutions; (2) The electrochemical reutilizing of the regeneration solution was shown to be highly effective.

TABLE 1

Results obtained from flowthrough adsorption/regeneration experiments conducted on the Zn—HCF composite material (PES = 20% w/w)

| Cycle # | Adsorbed mass mgN | Desorbed mass mgN | *Residual $NH4^+$ mgN/L | **Regeneration efficiency % |
|---|---|---|---|---|
| 1 | 66.17 | 52.67 | 0.09 | 120% |
| 2 | 53.80 | 58.44 | 0.12 | 91% |
| 3 | 55.57 | 51.76 | 0.15 | 107% |
| 4 | 56.89 | 59.20 | 0.15 | 96% |
| 5 | 54.72 | 57.03 | — | 96% |

*The ammonia mass remaining in the regeneration solution after the electrochemical ammonia oxidation step.
**See Equation 3.

21-Day Non-Live Simulation Experiments

Figure 5A:
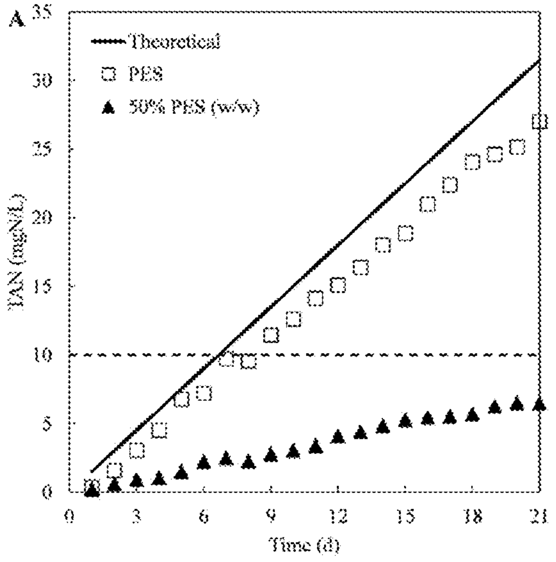
FIGS. 5A-B show the results of the Total ammonia nitrogen (TAN), i.e., the combined NH4+ and $NH_3$ concentration that accumulated over a period of 21 days of Simulations #1 and #2 experiments (FIGS. 5A and 5B, respectively).
Figure 5B:
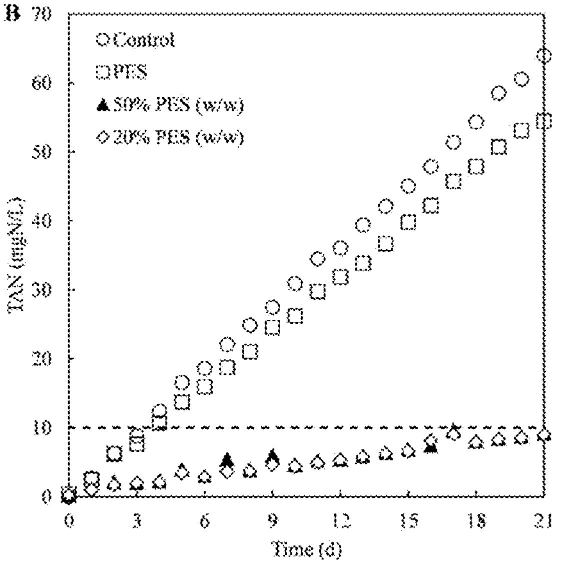

These experiments were conducted to simulate the ammonia that would be excreted by two high bio-loads of brown crab, for a prolonged trip, and to assess the capability of the adsorbing material to maintain the accumulated TAN concentration at below 10 mgN/L at the end of the trip. The daily $NH_4$+ addition in the two 21-day simulation runs was 1.50 and 3.29 mgN/(L·d), simulation #1 and #2, respectively, as shown in FIG. 5. In accordance with the experiments' design, the TAN concentration in the runs in which the water was recycled through a reactor filled with PES-Zn-HCF composite beads was maintained below 10 mgN/L. In contrast, the TAN concentration in the Control and theoretical curves (Simulation #1 and #2, FIGS. 5A-B) went up to 31 and 64 mgN/L, respectively. The PES surface area was responsible for ~15% of the TAN removal along the entire 21 days (results are shown only for Simulation #2). The $Zn_2$+ ion concentrations at the water tank were measured in simulation #2. All the concentrations were stable and below the acute toxicity of $Zn_2$+ to fish and shrimp in seawater, with average values of 0.13, 0.72, and 0.61 mg/L in the Control, 50%, and 20% PES weight ratio runs, respectively. The fact that $Zn_2$+ did not leach indicates a stable Zn-HCF structure. During the simulations, the temperature was kept at 3.7° C., and the pH was set at 6.9, both remained stable throughout the runs. These experiments prove that the composite material can be used to repress the accumulation of the TAN concentration in the holding water in a very effective way.

21-Day Experiments with Live Seabream Fish

Figure 6:
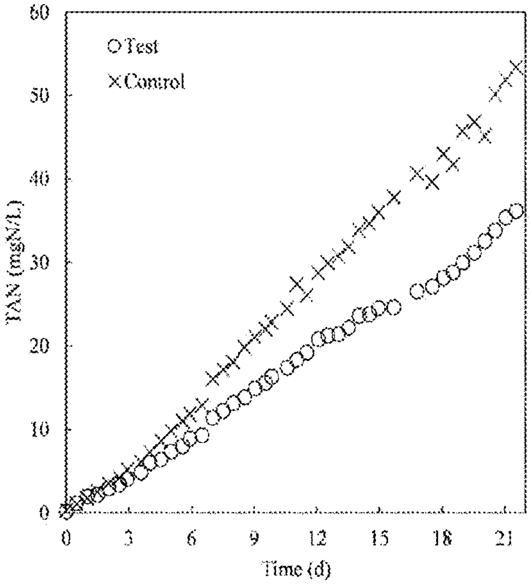
FIG. 6 follows the TAN concentration that accumulated during the experiment with live seabream fish over a period of 21 days. x and ○ represent the control and test tanks, respectively. Duration=21 days, temperature=18° C.

The amount of PES-Zn-HCF composite beads that was applied in this experiment was calculated such as to not reach acute $NH_3$ toxicity at pH 7.0 at the end of the 21 holding days, and in parallel to allow the $NH_4$+ concentration to accumulate to up to 40 mgN/L. The goal was to both test the well-being of the fish in the presence of the adsorbing material and also to validate the adsorption isotherm at a wide range of $NH_4$+ pseudo-equilibrium concentrations, at more realistic conditions, due to the presence of the live fish in the system and the longer retention times. Both the Test and the Control showed 100% fish survival. Good appetite and normal swimming behavior were observed during the entire test in either run, suggestive of good animal welfare. As shown in FIG. 6, at the end of the 21 days, the TAN concentration reached 53 and 36 mgN/L, and the $NH_3$ concentration was 0.11 and 0.08 mgN/L in the Control and Test tanks, respectively, which is within the recommended range for seabream aquaculture. DO was maintained at >7 mg/L and $CO_2$ at <10 mg$CO_2$/L in both tanks throughout the experiment's period. pH was set at 7.3 until Day 13, and then reduced to 7.0 in both Tanks, for maintaining the $NH_3$ concentration below the toxicity level for seabream. The $Zn_2$+ concentration was stable at 0.19+0.02 mg/L from Day 7, which is below the defined toxicity of this ion to aquatic animals in seawater.

Figure 7:
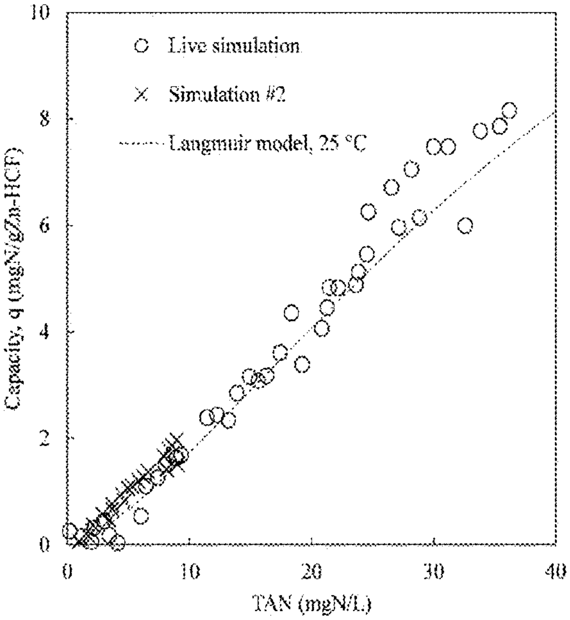
FIG. 7 shows a comparison between the PES-Zn-HCF composite beads capacity as a function of the $NH_4$+ concentration, for three scenarios: (1) results of the 25° C. Langmuir model isotherm (dashed line); (2) Results of the simulation #2 experiment at 3.7° C. (X); and (3) Results obtained in the live seabream fish experiment at 18° C. (○). The results show a stable capacity performance at a wide $NH_4$+ concentration range.

Due to the use of warm sea fish, the water temperature applied in the seabream experiment (~18° C.) was significantly higher than the temperature applied in cold-water seafood transportations, which is 3-5° C. (for minimizing the animals' metabolism rate and obtaining conditions supporting their hibernation). As a result of the low temperature operation, the microbial load is expected to be reduced by a factor of ~2 relative to the relatively high bacterial yield that was observed in these experiments. The relatively high temperature (18° C.), and the pre-filtration (55 μm filter and not UF, as suggested in FIG. 1) that were used in this experiment, exposed the composite material to harsher conditions (with regard to biofilm development during the experiment) in comparison to the conditions that are expected during the live seafood transportations. Nevertheless, FIG. 7 shows that these conditions did not affect the adsorbing capacity of the PES-Zn-HCF composite beads. In fact, the capacity observed in the 21-day live test showed an improved adsorbing capacity relative to the results predicted by the isotherm (FIG. 2. 48 h), probably due to the fact that the exposure times were much higher than 48 h.

The PES-Zn-HCF composite beads were regenerated with a 3 M NaCl solution at the end of the 21-day experiment. 94% of the $NH_4$+ was desorbed, according to the ammonia concentration that accumulated in the Control tank. The concentrations of nitrite and nitrate in the tanks showed no evidence of the occurrence of nitrification throughout the 21 days. Five beads that were cut into slices for examination under a microscope (magnitude X100) showed no evidence of biofouling on the surface of the beads and inside the inner pores (results are not presented).

Treatment System Footprint and Weight

For designing a treatment system for a 40-foot container that is intended to be shipped, the volume and weight demand of the system are significant factors. The payload capacity of a 40' reefer cannot exceed 28 tons hence the systems' weight should be reduced to a minimum for allowing a maximal bio-load per shipment. The calculations presented in this section assume a total brown crab bio-load of 5750 kg (i.e., 250 kg/$m^3$ in 18 $m^3$ of holding water) for a 21-day shipment, resulting in an overall release of 1250 gN to the water. The maximal TAN concentration allowed to accumulate in brown crab transports is 10 mgN/L, therefore the design parameter for the adsorbing material is 2.2 mgN/gZn-HCF, with a safety factor of 20% (see FIG. 2, which results in a requirement of 580 kg of the composite material and a net volume of ~1150 liter.

The recirculating flow rate through the treatment system was calculated for replacing the water in the seafood tanks twice a day (2 $m^3$/h) for attaining the required microorganisms' removal rate by the UF. Both the pre-filtration and the UF components were calculated for operating throughout the entire shipment without a backflush, resulting in a relatively large pre-filtration system (2 Spin-KlinTM Galaxy) requiring 1×0.5×0.8 $m^3$ (lxwxd) and 100 kg weight, and two UF modules (10") requiring 2.5×0.25×0.5 $m^3$ (lxwxd) and 200 kg of weight per unit. The activated carbon component was calculated with an HRT of 6 min, resulting in a 200 L AC column, enabling adsorption of ~2.5 kg of organic carbon. In total, the system weight was estimated at 1850 kg including filling water, piping, and the pump. The total electrical power demand on board the container was estimated at <5 KW for the recirculating pump (5 bar) and the pH control system, resulting in operation expenses of ~$12 per day. The capital cost of such a unit is estimated at $40,000, out of which the chemicals for the synthesis of the composite material amount to ~$5000 (~$10/kg beads). Based on the experience of the authors with various ion exchange resins and the fact that the composite beads remained unscathed after 10 operational cycles, we estimate that a battery of the composite material is expected to last up to 100 cycles (approximately ten years) with a very low (if any) physical and chemical deterioration, due to the high stability of both the polymer and the Zn-HCF in the composite material, and the efficient regeneration capability. Since the regeneration of the adsorbing material is not performed on board, the unit requires regeneration/replacement services that were estimated at $500 per transport. When summing all the costs (including the footprint), a system that is utilized for leveraging the technology's advantages is expected to return its investment in 6 to 12 months.

Conclusions

A new treatment system is presented, whose aim is to control the ammonia and bacterial concentrations that develop in the holding water during long transports of high-density live seafood species at low temperature. This paper focused on the synthesis and characterization of a stable composite material, made of Zn-HCF crystal bound by polyether-sulfone, as an efficient adsorbing material of $NH_4$+ from seawater. The results show that both the capacity and $NH_4$+ adsorption kinetics are adequate for the proposed aim. ~580 kg of PES-coated (20%) Zn-HCF are required to disallow the $NH_4$+ concentration to exceed 10 mgN/L during a 21-d trip (3.5° C.), in which the ammonia excreted in the transport of 5750 kg of brown crab (250 kg/$m^3$).

The material was tested also in an experiment with live seawater fish (seabream at 18° C.) and was shown to adsorb $NH_4$+ in a capacity that (slightly) exceeded the projection from the adsorption isotherms (due to the longer retention time). The stability of the adsorbing composite material was tested in two adsorption/regeneration experiments that were run for multiple cycles and showed no loss at all in the adsorption capacity or in physical appearance. The regeneration solution was shown to undergo efficient (indirect) ammonia electrooxidation by passing the solution through an electrolyzer by which a part of the high Cl-ion concentration is oxidized to $Cl_2$(aq), which in turn oxidized the ammonia to benign $N_2$(g). The CAPEX and OPEX related to installing and operating the treatment system in one 40-foot container were calculated and the ROI was estimated to be less than one year, depending on the number of trips and the value of the transported merchandize. The next step is to test the full technology (including the UF and AC units) on a lucrative live seawater species for 21 days at a high biodensity. The successful implementation of this technology has the potential to open new markets for live seafood species that are currently restricted to local markets due to transportation challenges. It also has the potential of considerably reducing the cost of some species that so far have been transported only by air freight and hence marketed at very high prices.

Experimental Setup II

Materials and Methods

Two 1 $m^3$ tanks, containing 875 liters of seawater were each loaded with 150 kg of brown crab with an average weight of 510 g. The tanks were aerated using two linear air pumps with a total air flow rate of 190 L/min/tank connected to airlifts (four units per tank) and diffusion pipes that were placed at the bottom of the tanks. In the Test tank, nine mesh bags (Mesh #18) holding 1.5 L (580 g ZnHCF) of PES-ZnHCF beads each, were placed at the bottom. Four more mesh bags were placed close to the tank water's surface. In total, 19.5 L of ZnHCF beads with a mass of 7.54 kg was positioned in the Test tank.

The Control tank had an identical structure to the Test tank, apart from not containing the ZnHCF beads. Both tanks were covered and positioned in a chilled warehouse. The endpoints of the trial were defined in advance as either reaching Day 5 or arriving at a TAN concentration higher than 15 mgN/L in either tank, for averting acute stress to the crabs. Upon arrival at the endpoint of either tank, twenty crabs from each tank were packed in a polystyrene box equipped with ice gel, according to air-freight shipping protocols. The boxes were kept in a chilled environment (~5° C.), and the crabs were evaluated for survival rate and physical condition 24 and 48 h post-packing.

The crabs were delivered to the holding facility 24 h before the start of the trial and were held immersed in a chilled seawater pond for recovery from the transfer. All the crabs were counted upon being loaded into the experimental tanks.

Alkalinity Based Analysis

Alkalinity was measured using the Gran titration method while assuming that the main weak acids in the tested water are the carbonate and ammonia systems.

The used alkalinity equation is described in Equation 2, with $CO_2$ (expressed as $H_2CO_3$*) and $NH_4^+$ as reference species:

$$alk\ (H_2CO_3^*, NH_4^+) = 2\cdot[CO_3^{2-}] + [HCO_3^-] + [NH_3] + [OH^-] - [H^+] \quad (3)$$

Since alkalinity is a conservative parameter, the changes in its value can be used to perform a mass balance on TAN to assess its excretion rate, as the $NH_3$ species (which is excreted by the crabs) adds to the alkalinity value, while the excretion of $CO_2$ (the reference species in the alkalinity equation) does not.

Water Quality Analyses

During the experimental period, TAN, DO, pH, alkalinity, and temperature were measured twice a day, and samples for TOC, P. $Zn^{2+}$, $Na^+$ and $K^+$ concentrations were taken once a day and preserved at pH 2. TAN was measured using the Salicylate method, DO was measured using an Oxiguard Polaris device, and pH was measured using a Eutech Cyberscan meter. Cations and total orthophosphate (Pr. $Zn^{2+}$, $K^+$, $Na^+$) concentrations were analyzed using a PlasmaQuant PQ 9000 Elite, High-Resolution Array ICP-OES (Analytik Jena AG, Germany), and TOC was analyzed using a Sievers $M_{5310}$C (Suez Water Technologies, Boulder Co, USA) TOC Analyzer. The $NH_3$(aq) concentration was calculated from TAN and pH and the $CO_2$(aq) concentration was calculated from the pH and alkalinity values using the PHREEQC program (database=SIT.dat).

Results and Discussion

The Test and Control tanks were loaded with 150 (N=290) and 151 kg (N=291) of crabs, respectively. The experiment in the Control tank was stopped after 2.3 days due to animal welfare concerns, as the TAN concentration had risen above 15 mgN/L (the predefined stoppage criteria). The survival rate in the Control tank at that point was 95%. The holding in the Test tank was stopped after almost five days (4.8 d), as planned, with a survival rate of 91%. The experiment was conducted at the end of March, when fished Brown Crabs are naturally weaker due to the low sea temperature and typically show slightly lower survival rates than during the fishing season, so the results of both survival rates can be considered within the industry's standards. Table 2 shows the survival rate in the dry-pack boxes. A significant difference in the survival rate was observed between the crabs from the Control and the Test tanks that were packed on Day 2.3, and even between the Control crabs and the Test crabs that were packed after 4.8 days. A 100% and 95% survival rate were observed after 2.3 and 4.8 holding days for the Test crabs after 24 h dry pack, in comparison to a survival rate of 75% observed in the Control. Note that 24 h is considered sufficient for most live airfreight shipments. A significant difference between the Test and the Control in the survival rates was observed also after 48 h of dry pack, but these results might have been affected by the handling at the 24 h check point. Nevertheless, the crabs that were dry packed on Day 2.3 showed 95% and 55% survival in the Test and the Control tanks, respectively. Furthermore, in a qualitative manner, the crabs that were dry packed from the Test tank looked vivid and strong at all the checkpoints, while the crabs from the Control were much weaker.

TABLE 2

The survival rate observed in the dry shipment simulations after 24 and 48 hours

| | Control | Test | Test |
|---|---|---|---|
| Packing day | 2.3 | 2.3 | 4.8 |
| Wet holding (h) | 55 | 55 | 115 |
| 24 h | 75% | 100% | 100% |
| 48 h | 55% | 95% | 70% |

Water Quality Characteristics

The dissolved oxygen concentration during the simulations was 9.4+0.8 and 8.4+0.6 mg/L, and the calculated $CO_2$ concentrations were 6.6+1.6 and 7.5+1.9 mg$CO_2$/L in the Test and the Control tanks, respectively, which fall within the recommended range. The initial pH in both tanks was 7.1. A gradual pH increase was observed in both tanks due to the alkalinity addition, resulting mainly from the protonation of the nonionic ammonia excreted by the animals. The final pH was 7.60 and 7.57 in the Test tank (Day 4.8) and the Control tank (Day 2.3), respectively. The TOC initial concentration was 30 mgC/L. An accumulation of 1.5 and 2.1 mgC/L per day was observed in the Test and the Control tanks, respectively. No changes were measured in the $Zn^{2+}$, $Na^+$ and $K^+$ concentrations within the Test tank throughout the experiment, indicative of the high stability of the ZnHCF beads under the applied conditions. It is noted that hexacyanoferrate salts are defined as safe food additives by the European Food Safety Authority.

The temperature measured in both the Test and Control tanks was similar, with differences smaller than 0.2° C. At t=0 the temperature was 10° C., which is well above the recommendation for live Brown Crab wet transports. A temperature below 5° C. forces the crabs into hibernation mode, while higher temperatures promote higher metabolic activity, and as a result, higher ammonia excretion rates. The temperature was gradually reduced during the entire experimental period (the temperature on Day 4.8 was 5.3° C.).

Figure 8A:
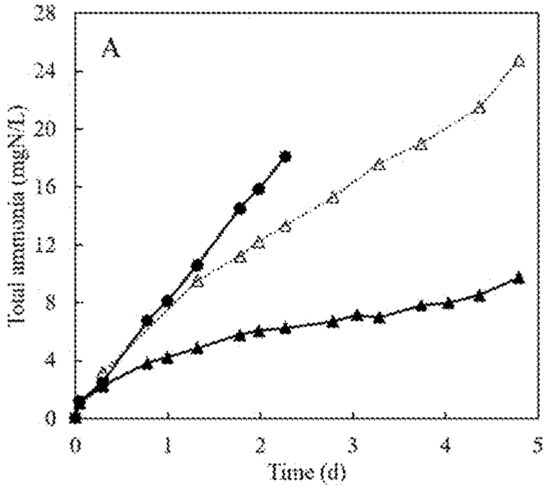
FIGS. 8A-B depict (FIG. 8A) measured TAN concentration (A; continuous) and approximated ammonia excretion (dotted) by the crabs throughout the operation of the Test (Δ) and Control (O) tanks.
Figure 8B:
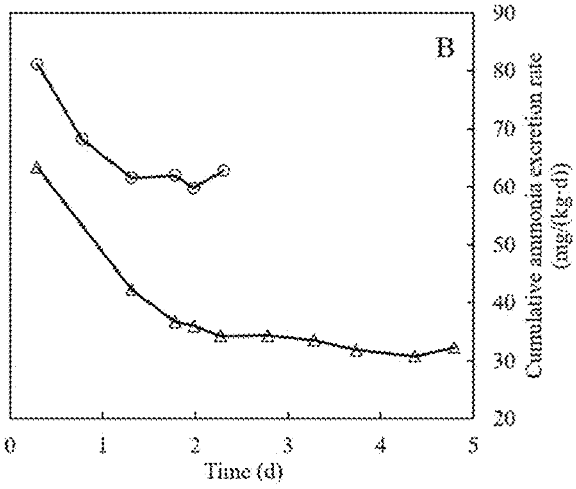

The effect of the ZnHCF on the TAN concentration in the Test tank was apparent from Day 1 (FIG. 8). As shown in FIG. 8A, a higher TAN concentration resulted in a higher operational capacity of the ZnHCF, which led to an increased TAN removal effect thereby slowing down the TAN accumulation in a positive feedback manner. The calculation of the ammonia excreted by the crabs in the Test tank was based on the accumulated alkalinity. Analysis of the accumulation of the alkalinity value in the Control tank showed that the $NH_3$ excretion by the crabs accounted for ~81% of the measured value (Eq. 2). The total phosphate concentration at the end of Day 2.3 and Day 4.8 in the Control and Test tanks were 1.24 and 2.63 mgP/L, respectively, which means that the phosphate concentration had a negligible effect on the measured alkalinity value. The difference (19%) was attributed to the known phenomenon of the crabs' acid-base ion regulation. The same fraction from the accumulated alkalinity (81%) was assumed in the calculations performed in the test tank, with the aim of quantifying the ammonia mass excreted by the crabs (FIG. 8).

The ammonia excretion rates (FIG. 8B) in both treatments were moderate (i.e., not extreme), indicating that the crabs were not under acute stress in either treatment throughout the trials' duration. Nevertheless, after 24 h, due to the unrestricted accumulation of ammonia in the Control the gap between the calculated ammonia excretion rates in the Control and Test tanks started to widen, reaching a doubled ammonia excretion rate in the Control on Day 2.3. An increasing ammonia excretion rate during live holding is associated with stress, and therefore in an increased metabolic rate. The $[NH_3]$ curves (results not shown) of both the Test and Control tanks showed similar trends as the TAN curves, ending at 0.035 and 0.073 mgN/L in the Test and Control tanks, respectively. To date, with respect to Brown Crabs live wet transports, we could not find any threshold recommended concentrations for either TAN or $NH_3$. According to our interpretation from literature data and our gathered experience, we propose that the TAN and $NH_3$ concentrations should not exceed 5 and 0.02 mgN/L, respectively, during Brown Crab live wet holding or transportations (exposure on a scale of days to weeks).

Figure 9:
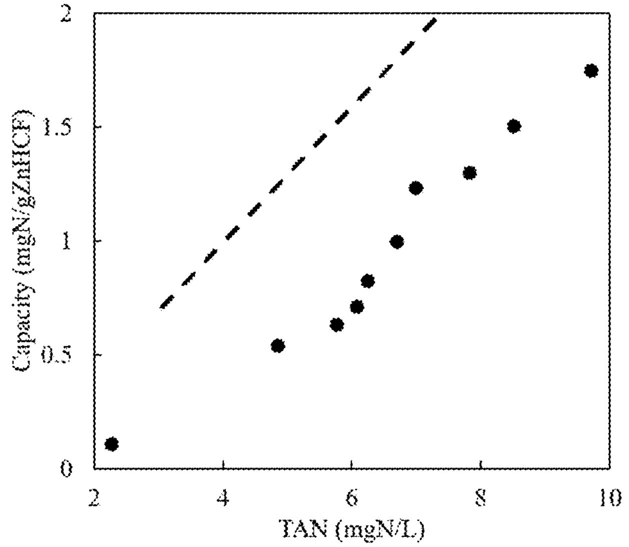
FIG. 9 depicts the operational capacity of the ZnHCF beads to $NH_4^+$ as a function of the TAN concentration in the holding water (•); Dotted line: data of an $NH_4^+$ adsorption isotherm obtained at laboratory conditions with seawater at 3.5° C.

FIG. 9 shows the operational capacity of the ZnHCF throughout the experiment (based on the calculated excreted ammonia), versus the results of the capacity of an isotherm that was produced in the lab (HRT=48 h; Temp. =3.5° C.). In contrast to a capacity derived isotherm, obtained in lab for each equilibrium TAN concentration, the operational capacity reported here is dynamic in nature, having both a continuous source and a continuous sink (adsorption) of ammonia, therefore it is affected by the kinetics of both the ammonia excretion and its adsorption. A Comparison between the ZnHCF $NH_4^+$ operational capacity recorded in this work to known isotherms shows that the operational capacity in the field test displayed a ~48 h delay relative to the isotherm values. The delay can be attributed to the relatively slow adsorption kinetics of the ZnHCF composite beads. Moreover, it is known that the adsorption capacity of ZnHCF was much greater at 3.5° C. than at 25° C. The experiment shown here was conducted at a temperature range of 10 through 5° C., hence the operational capacity could be expected to be somewhat lower than the isotherm at 3.5° C., that is shown in the dashed line in FIG. 9.

The cumulative ammonia excretion rate trend (FIG. 8B) showed a high excretion rate during the first 24 hours after loading. This is logically attributed to stress related to handling, along with the high-water temperature at the beginning of the tests. Due to technical issues, the loading method of the crabs in this work did not include an adjustment phase, which is sometimes practiced between loading and transport. Such an adjustment seems to be crucial for reducing the stress during the initial stage of the transport and thus TAN accumulation and can allow for an increased shipping duration and/or application of an increased biodensity. For example, on Day 1 of this work, the crabs excreted an amount of ammonia that was later in the test excreted on Days 3 and 4 combined. As mentioned, this high value was probably due to a combination of the non-ideal handling and the relatively high water-temperature.

Figure 10:
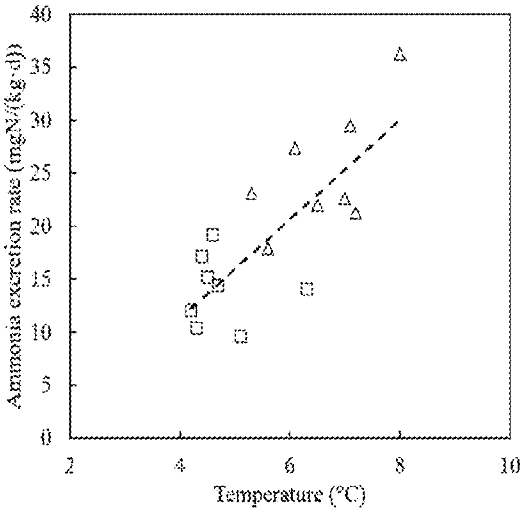
FIG. 10 depicts a calculated ammonia excretion rate by Brown Crabs as a function of the holding water temperature. Values from this work (Δ); (□) values adopted from the art. Dashed line is a linear trendline ($R^2$=0.60).

FIG. 10 includes results from both this work and from a previous work of the inventors, that is shown with the aim of quantifying the effect of temperature on the ammonia excretion rate of transported Brown Crabs. According to FIG. 10, at the temperature range 4-8° C., a reduction of 1° C. in the temperature results in a reduction of 4.6+2.1 mgN/(kg·d) in the ammonia excretion rate. The trendline demonstrated in FIG. 10 meets the X axis at 1.45+0.9° C., suggesting it to be the lower threshold for the Brown Crab temperature tolerance. A similar value (1.3° C.) was previously postulated as the lower critical temperature for Brown Crabs. In correspondence with Brown Crab live transports, FIG. 10 delineates the significance of a precise and a reliable temperature control during Brown Crabs holding/shipments and provides an important design parameter for holding and live transport operations.

Conclusions

The results show that the TAN concentration that develops during Brown Crab live transports can be efficiently controlled solely by the addition of ZnHCF beads to the Test tank at a ratio of 1 kg of ZnHCF to 22 kg of crabs.

Reducing both the $NH_4$+ and $NH_3$ concentrations by the ZnHCF during the wet-transport simulation had an effect of reducing the crabs' stress related to immersed live shipments, which dramatically improved the survival rate in the following dry shipment simulations to 100% during the first 24 h. These results strengthen the assumption that $NH_4$+ and $NH_3$ are the bottlenecks in the wet holding of Brown Crabs and hint at the potential leap in the animal welfare performance that can be achieved in this industry only by performing efficient ammonia removal.

Judging by the performance of the Test crabs vs. the Control crabs, the presence of the ZnHCF did not have a negative health effect on the crabs. A good indication of the stability of the ZnHCF was obtained by quantifying the $Zn_2$+ concentration in the Test tank, which showed a constant value.

This work demonstrates the importance of adjusting the crabs before loading them to wet holding tanks, and the importance of practicing the transport at temperatures lower than 5° C. Such meticulousness is crucial to be wellbeing of the animals, the product quality, and the survival rate and will assist in increasing the biomass density and/or the longevity of a given transport.

The ammonia excretion rate of Brown Crabs under holding conditions (4-8° C.) as a function of the water temperature is reported in this in this work, for the first time, to be 4.6+2.1 mgN/(kg·d·° C.).

The invention claimed is:

1. A water treatment system, the system comprising a tank configured for holding water and live aquatic animals, a circulation module configured and operable for circulating water present in said tank through a purification unit provided with a solid medium comprising a metal hexacyanoferrate of the form $M^1{}_2M^2{}_3[Fe(CN)_6]_2$, wherein $M^1$ is a monovalent metal cation and $M^2$ is a bivalent metal cation.

2. The system according to claim 1, when mounted on a vehicle.

3. The system according to claim 1, wherein the circulating module is in a form of an external loop comprising means for flowing water from said tank and through the purification unit and back into the tank, wherein the purification unit is positioned at a point along the external loop extending a tank water outlet and a tank water return inlet.

4. The system according to claim 3, wherein the external loop comprises at least one additional purification and/or filtering units.

5. The system according to claim 1, the system being a circulating water purification system, the system comprising a tank or a container configured for holding live aquatic animals, a purification unit, at least one sensor, and a controller the purification unit including a membrane or a filtering unit or a filtering medium or an adsorbent comprising the metal hexacyanoferrate material, wherein the tank or container is in liquid communication with the purification unit to permit flow of water contained in said tank or container into and through the purification unit and to receive treated water existing the purification unit;

wherein the at least one sensor is provided in said tank or container and is electrically connected with the controller; the sensor being configured and operable to detect and report to said controller a rise in a concentration of at least one ion type in the water, whereby the controller is configured to initiate circulation of the water through the purification unit.

6. A circulating water purification system, the system comprising a tank or a container configured for holding live aquatic animals, a purification unit, at least one sensor, and a controller, the purification unit including a membrane or a filtering unit or a filtering medium or an adsorbent comprising a metal hexacyanoferrate of the form $M^1{}_2M^2{}_3[Fe(CN)_6]_2$, wherein $M^1$ is a monovalent metal cation and $M^2$ is a bivalent metal cation, wherein the tank or container is in liquid communication with the purification unit to permit flow of water contained in said tank or container into and through the purification unit and to receive treated water existing the purification unit;

wherein the at least one sensor is provided in said tank or container and is electrically connected with the controller; the sensor being configured and operable to detect and report to said controller a rise in a concentration of ammonium ions in the water, whereby the controller is configured to initiate circulation of the water through the purification unit.

7. The system according to claim 1, comprising a pH controller configured and operable to maintain a water neutrality, to thereby shift ammonia present in the system towards ammonium ions, thereby not allowing the nonionic ammonia ($NH_3$) concentration to rise.

8. A water purification system comprising a purification unit having an inlet and a permeate outlet;

a circulation conduit configured and operable to communicate water from a water tank through a tank outlet into the purification unit and to communicate the permeate into the water tank through a tank inlet, wherein the inlet and outlet form a re/circulation loop;

the purification unit including a filtering medium or an adsorbent comprising a metal hexacyanoferrate of the form $M^1{}_2M^2{}_3[Fe(CN)_6]_2$, wherein $M^1$ is a monovalent metal cation and $M^2$ is a bivalent metal cation.

9. A water purification system comprising:

a water tank configured for holding live aquatic animals;

a first auxiliary container for receiving a volume of water to be treated from said water tank;

a purification unit or a unit containing a metal hexacyanoferrate of the form $M^1{}_2M^2{}_3[Fe(CN)_6]_2$, wherein $M^1$ is a monovalent metal cation and $M^2$ is a bivalent metal cation, or a medium comprising same, said unit being provided downstream of the first auxiliary container and in fluid communication with the first auxiliary container for receiving the volume or water from the water tank;

a second auxiliary container provided downstream of the purification unit and in fluid communication with the purification unit and comprising an outlet port arranged to communicate filtered water back into the water tank;

one or more purification units for comprising one or more of a carbon-based filter and a biological filter.

10. The system according to claim 1, wherein the metal hexacyanoferrate is of the structure $M^1{}_2M^2{}_3[Fe(CN)_6]_2$, wherein M1 is K and M2 is Be, Mg, Ca, Sr, Ba, Ni, Cu, Zn, Fe, Mn, or Cd.

11. The system according to claim 1, wherein the metal hexacyanoferrate is of the structure $K_2M^2{}_3[Fe^{11}(CN)_6]_2$, wherein M2 is Zn, Co, Ni or Cu.

12. The system according to claim 11, wherein $M^2$ is Zn.

13. The system according to claim 1, wherein the metal hexacyanoferrate is $K_2Zn_3[Fe^{11}(CN)_6]_2$, $K_2Co_3[Fe^{11}(CN)_6]_2$, $K_2Ni_3[Fe^{11}(CN)_6]_2$, or $K_2Cu_3[Fe^{11}(CN)_6]_2$.

14. A purification unit implementing a medium or a matrix comprising a metal hexacyanoferrate of the form $M^1{}_2M^2{}_3[Fe(CN)_6]_2$, wherein $M^1$ is a monovalent metal cation and $M^2$ is a bivalent metal cation.

15. A water tank configured to hold water and live aquatic animals, said water tank being provided with (i) an amount of an adsorbing material or (ii) an auxiliary unit that is configured to be in liquid communication with said water tank and which comprises an adsorbing material, wherein the adsorbing material is or comprises a metal hexacyanoferrate of the form form $M^1{}_2M^2{}_3[Fe(CN)_6]_2$, wherein $M^1$ is a monovalent metal cation and $M^2$ is a bivalent metal cation.

16. A method for purifying water or salt-rich waters, or for removing or reducing an amount of a monovalent cation selected from $NH_4$+, $Rb^+$ and $Cs^+$ from water or salt rich waters, the method comprising contacting or flowing said water or salt-rich waters with or through an adsorbing material that is or that comprises a metal hexacyanoferrate of the form form $M^1{}_2M^2{}_3[Fe(CN)_6]_2$, wherein $M^1$ is a monovalent metal cation and $M^2$ is a bivalent metal cation.

17. The system according to claim 5, further comprising a water reservoir.

18. The system according to claim 6, further comprising a water reservoir.

19. The system according to claim 6, wherein the at least one sensor is a pH sensor.

* * * * *